(12) United States Patent
Roy Chowdhury et al.

(10) Patent No.: US 11,727,427 B2
(45) Date of Patent: Aug. 15, 2023

(54) SYSTEMS AND METHODS FOR ASSESSING, CORRELATING, AND UTILIZING ONLINE BROWSING AND SALES DATA

(71) Applicant: Volvo Car Corporation, Gothenburg (SE)

(72) Inventors: Sohini Roy Chowdhury, Santa Clara, CA (US); Jon Seneger, Boulder Creek, CA (US); Ebrahim Alareqi, Santa Clara, CA (US); Joakim Soderberg, Gothenburg (SE); Ao Liu, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 210 days.

(21) Appl. No.: 17/080,909

(22) Filed: Oct. 27, 2020

(65) Prior Publication Data
US 2022/0129937 A1   Apr. 28, 2022

(51) Int. Cl.
| | | |
|---|---|---|
| G06Q 30/02 | (2023.01) | |
| G06Q 30/0207 | (2023.01) | |
| G06Q 30/0201 | (2023.01) | |
| G06Q 30/0601 | (2023.01) | |
| G06Q 50/04 | (2012.01) | |
| G06F 16/9536 | (2019.01) | |
| G06Q 30/0204 | (2023.01) | |
| G06Q 10/04 | (2023.01) | |
| G06N 3/08 | (2023.01) | |

(Continued)

(52) U.S. Cl.
CPC ..... *G06Q 30/0222* (2013.01); *G06F 16/9536* (2019.01); *G06N 3/08* (2013.01); *G06N 20/20* (2019.01); *G06Q 10/04* (2013.01); *G06Q 10/087* (2013.01); *G06Q 30/0201* (2013.01); *G06Q 30/0204* (2013.01); *G06Q 30/0621* (2013.01); *G06Q 30/0623* (2013.01); *G06Q 30/0631* (2013.01); *G06Q 50/04* (2013.01)

(58) Field of Classification Search
None
See application file for complete search history.

(56) References Cited

U.S. PATENT DOCUMENTS

| | | |
|---|---|---|
| 6,868,389 B1 | 3/2005 | Wilkins et al. |
| 9,275,342 B2 | 3/2016 | Vijayaraghavan et al. |
| 9,747,611 B2 | 8/2017 | Battista |
| | (Continued) | |

OTHER PUBLICATIONS

US 11,481,840 B2, 10/2022, Celia (withdrawn)*

(Continued)

*Primary Examiner* — Matthew D Henry
(74) *Attorney, Agent, or Firm* — Clements Bernard Walker; Christopher L. Bernard

(57) ABSTRACT

The present disclosure provides systems, methods, and metrics that filter out online visitor behavioral data that represents a potential lead with a high likelihood to convert to a vehicle sale from online visitor behavioral data that does not represent a potential lead with a low likelihood to convert to a vehicle sale, based on a mapping of sales back to observed website and vehicle configurator data. This enables more effective lead generation and the more efficient targeting of online incentive offers and sales "nudges," for example. Further, the present disclosure enables web analytics data to be combined with sales data for sales forecasting in general.

15 Claims, 11 Drawing Sheets

(51) Int. Cl.
*G06N 20/20* (2019.01)
*G06Q 10/087* (2023.01)

(56) References Cited

U.S. PATENT DOCUMENTS

| | | |
|---|---|---|
| 10,373,177 B2 | 4/2019 | Vijayaraghavan et al. |
| 10,482,510 B2 | 11/2019 | Berger et al. |
| 10,692,122 B2 | 6/2020 | Esposito et al. |
| 2004/0019516 A1 | 1/2004 | Puskorius et al. |
| 2005/0177337 A1 | 8/2005 | Beyer et al. |
| 2008/0162270 A1* | 7/2008 | Kim .................. G06Q 30/0202 705/7.31 |
| 2010/0251128 A1* | 9/2010 | Cordasco .............. G06F 11/328 715/736 |
| 2013/0169666 A1* | 7/2013 | Pacheco ................... G09G 5/02 345/593 |
| 2014/0122178 A1 | 5/2014 | Knight et al. |
| 2015/0269609 A1 | 9/2015 | Mehanian et al. |
| 2017/0270416 A1 | 9/2017 | Sri et al. |
| 2018/0150907 A1 | 5/2018 | Antley et al. |
| 2018/0189806 A1* | 7/2018 | Fordyce ............... G06Q 20/384 |
| 2022/0129937 A1* | 4/2022 | Roy Chowdhury ... G06N 20/20 |

OTHER PUBLICATIONS

Chen et al. (Chen, IF., Lu, CJ. Sales forecasting by combining clustering and machine-learning techniques for computer retailing. Neural Comput& Applic 28, pp. 2633-2647 (2017), Published Feb. 3, 2016).*

* cited by examiner

SYSTEMS AND METHODS FOR ASSESSING, CORRELATING, AND UTILIZING ONLINE BROWSING AND SALES DATA

TECHNICAL FIELD

The present disclosure relates generally to the automotive field. More particularly, the present disclosure relates to systems and method for assessing, correlating, and utilizing online browsing and sales data in a vehicle shopping and purchasing context.

BACKGROUND

All automotive manufacturers and sales entities collect behavioral data related to online visitors to their websites and vehicle configurators. This behavioral data can be useful to improve the online visitor experience by highlighting aspects that are confusing and promoting a smoother browsing and shopping experience in general. The behavioral data accumulates rapidly, potentially becoming millions of records generated per day. This necessitates smart classification methodologies, separating records that are likely to result in an ultimate sale from those that are not. In order to perform this classification, it is logically necessary to correlate meaningful shopping data to subsequent sales data, mapping the latter back to the former. The mining of such "hot" leads is not currently feasible.

This background is provided as an illustrative contextual environment only. It will be readily apparent to those of ordinary skill in the art that the systems and methods of the present disclosure may be implemented in other contextual environments as well.

SUMMARY

The present disclosure provides systems, methods, and metrics that filter out online visitor behavioral data that represents a potential lead with a high likelihood to convert to a vehicle sale from online visitor behavioral data that does not represent a potential lead with a high likelihood to convert to a vehicle sale, based on a mapping of sales back to observed website and vehicle configurator data. This enables more effective lead generation and the more efficient targeting of online incentive offers and sales "nudges," for example. Further, the present disclosure enables web analytics data to be combined with sales data for sales forecasting in general.

In one illustrative embodiment, the present disclosure provides a method, including: receiving web analytics data including identification information from a web analytics database of a web interface; filtering the web analytics data including the identification information to generate subset of the web analytics data that indicates a relatively higher probability for completion of a sales transaction; and offering users or sessions associated with the subset of the web analytics data an offer inducement to complete sales transaction via the web interface. Filtering the web analytics data including the identification information includes appending usage-specific feature data to each record of the web analytics data including the identification information. Filtering the web analytics data including the identification information further includes determining a probability for the completion of the sales transaction for each record of the web analytics data including the identification information and the appended usage-specific feature data using a classification data model and thresholding the probability for the completion of the sales transaction for each record of the web analytics data including the identification information. Optionally, the method also includes correlating historical sales transaction data to the web analytics data to determine which product types are more probable to be involved in the sales transaction and which product types are less probable to be involved in the sales transaction; and adjusting one or more of a manufacturing operation and an inventory allotment based on the determination as to which product types are more probable to be involved in the sales transaction and which product types are less probable to be involved in the sales transaction. Correlating the historical sales transaction data to the web analytics data includes: encoding the web analytics data and the historical sales transaction data such that a resulting feature space represents product configurations, price per product configuration, and a fraction of each product configuration sold in a time period, T; clustering web analytics records associated with the web analytics data and sales transaction records associated with the sales transaction data; for each cluster, assigning a nearest cluster identification using a k-nearest neighbor method; establishing a cost function between clusters; selecting a training cluster and a plurality of validation clusters; using the training cluster, generating a joint distribution heat map indicating correlations between the web analytics data and the historical sales transaction data; and, using the joint distribution heat map, identifying product configurations that do not correlate with any sales data.

In another illustrative embodiment, the present disclosure provides a non-transitory computer-readable medium including instructions stored in a memory and executed by a processor to carry out the steps including: receiving web analytics data including identification information from a web analytics database of a web interface; filtering the web analytics data including the identification information to generate subset of the web analytics data that indicates a relatively higher probability for completion of a sales transaction; and offering users or sessions associated with the subset of the web analytics data an offer inducement to complete sales transaction via the web interface. Filtering the web analytics data including the identification information includes appending usage-specific feature data to each record of the web analytics data including the identification information. Filtering the web analytics data including the identification information further includes determining a probability for the completion of the sales transaction for each record of the web analytics data including the identification information and the appended usage-specific feature data using a classification data model and thresholding the probability for the completion of the sales transaction for each record of the web analytics data including the identification information. Optionally, the steps also include: correlating historical sales transaction data to the web analytics data to determine which product types are more probable to be involved in the sales transaction and which product types are less probable to be involved in the sales transaction; and adjusting one or more of a manufacturing operation and an inventory allotment based on the determination as to which product types are more probable to be involved in the sales transaction and which product types are less probable to be involved in the sales transaction. Correlating the historical sales transaction data to the web analytics data includes: encoding the web analytics data and the historical sales transaction data such that a resulting feature space represents product configurations, price per product configuration, and a fraction of each product configuration sold in a time period, T; clustering web analytics records associated with the web analytics data and sales transaction records associated with the sales transaction data; for each cluster, assigning a nearest cluster identification using a k-nearest neighbor method; establishing a cost function between clusters; selecting a training cluster and a plurality of validation clusters; using the training cluster, generating a joint distribution heat map indicating correlations between the web analytics data and the historical sales transaction data; and, using the joint distribution heat map, identifying product configurations that do not correlate with any sales data.

In a further illustrative embodiment, the present disclosure provides a method, including: receiving web analytics data from a web analytics database of a web interface; correlating historical sales transaction data to the web analytics data to determine which product configurations are more probable to be involved in a sales transaction and which product configurations are less probable to be involved in the sales transaction; and adjusting one or more of a manufacturing operation and an inventory allotment based on the determination as to which product configurations are more probable to be involved in the sales transaction and which product configurations are less probable to be involved in the sales transaction. Correlating the historical sales transaction data to the web analytics data includes finding a joint probability distribution between the historical sales transaction data and the web analytics data using sub-spatial clustering. The sub-spatial clustering is performed using one of a random forest model, a Fisher scoring model, a total variance analysis model, and a Fisher discriminant analysis model that assigns weights to each feature in each product configuration. The method further includes, given a user submitting a desired product configuration via the web interface, suggesting a closest product configuration via the web interface based on a closest match related to features in each product configuration with relatively higher weights.

In a still further illustrative embodiment, the present disclosure provides a non-transitory computer-readable medium including instructions stored in a memory and executed by a processor to carry out the steps including: receiving web analytics data from a web analytics database of a web interface; correlating historical sales transaction data to the web analytics data to determine which product configurations are more probable to be involved in a sales transaction and which product configurations are less probable to be involved in the sales transaction; and adjusting one or more of a manufacturing operation and an inventory allotment based on the determination as to which product configurations are more probable to be involved in the sales transaction and which product configurations are less probable to be involved in the sales transaction. Correlating the historical sales transaction data to the web analytics data includes finding a joint probability distribution between the historical sales transaction data and the web analytics data using sub-spatial clustering. The sub-spatial clustering is performed using one of a random forest model, a Fisher scoring model, a total variance analysis model, and a Fisher discriminant analysis model that assigns weights to each feature in each product configuration. The steps further include, given a user submitting a desired product configuration via the web interface, suggesting a closest product configuration via the web interface based on a closest match related to features in each product configuration with relatively higher weights.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF ILLUSTRATIVE EMBODIMENTS

Again, the present disclosure provides systems, methods, and metrics that filter out online visitor behavioral data that represents a potential lead with a high likelihood to convert to a vehicle sale from online visitor behavioral data that does not represent a potential lead with a high likelihood to convert to a vehicle sale, based on a mapping of sales back to observed website and vehicle configurator data. This enables more effective lead generation and the more efficient targeting of online incentive offers and sales "nudges," for example. Further, the present disclosure enables web analytics data to be combined with sales data for sales forecasting in general.

Figure 1:
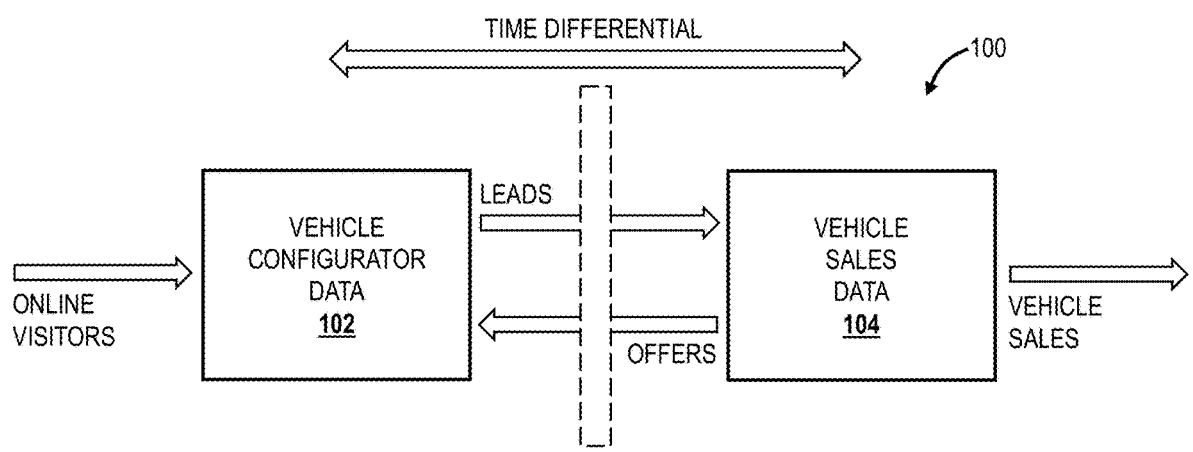
FIG. 1 is a schematic diagram of an illustrative architecture for an online vehicle configurator and vehicle sales dashboard.

FIG. 1 is a schematic diagram of an illustrative architecture 100 for an online vehicle configurator 102 and vehicle sales dashboard 104. The vehicle configurator 102 is a typical web-based platform that allows a user to "build" and locate a desired vehicle and provides a wide array of user configuration data, such as User Identification (ID), Session ID, Time Stamp, Location, Vehicle, Options, etc. The vehicle sales dashboard 104 provides a wide array of vehicle sales data, such as Dealer ID, Manufacture Suggested Retail Price (MSRP), Time Stamp, Vehicle ID, Options, etc. The vehicle sales dashboard 104 may account for online vehicle sales, entered in-person vehicle sales, etc. The vehicle configurator 102 is operable for generating leads for the sales entities 104, and the sales entities 104 can provide inventive offers and inducements based on good lead information. Currently, however, there is no effective way to assess good leads, and no effective way to associate a User ID and vehicle configurator behavior with a completed sale. Thus, WA has effectively been rendered useless. Millions of WA configurations are generated every year, whereas a fraction of that results in completed sales. Thus, there is a need to filter these WA configurations to build fidelity for tracking these online configurations to sales. Otherwise, many potential customers that perform an online search but do not submit a formal lead are not mined for a sale.

Figure 2:
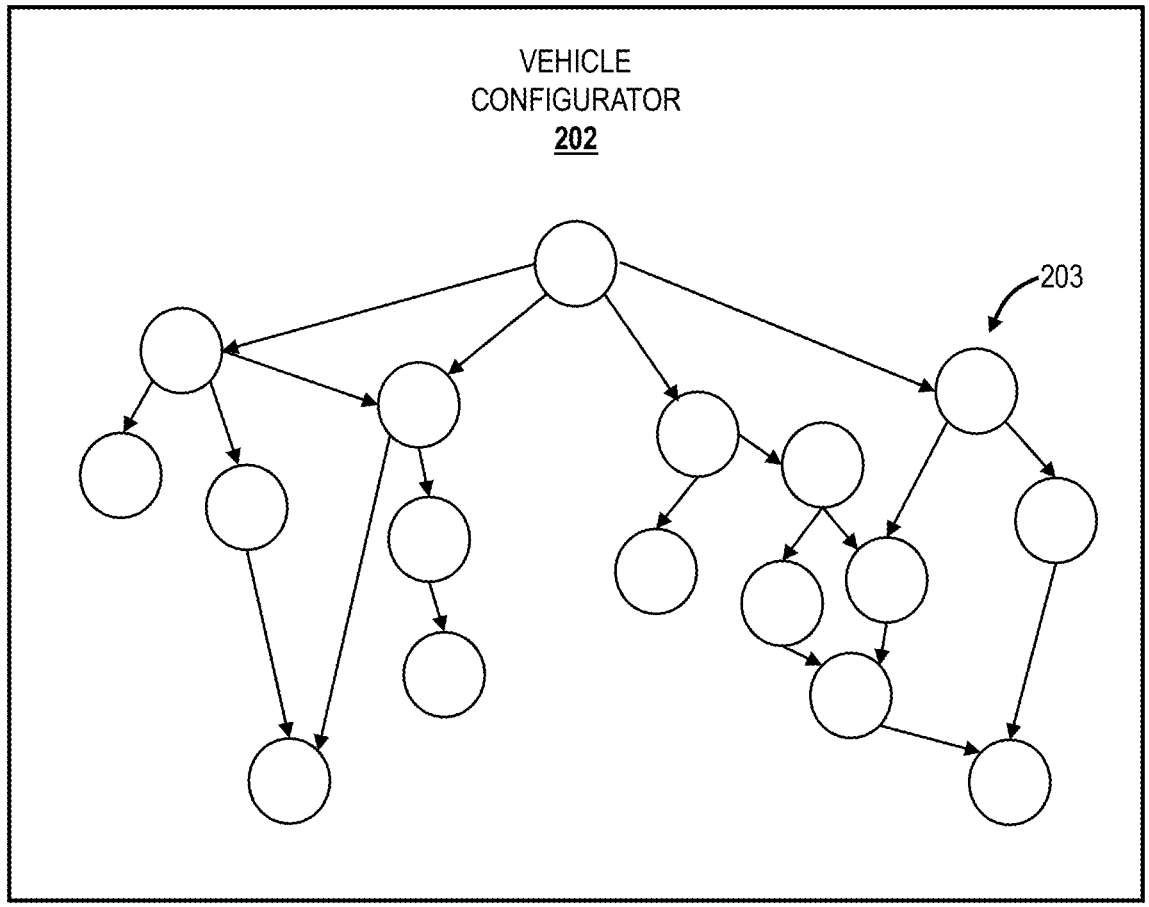
FIG. 2 is a schematic diagram of a baseline method for analyzing user behavior associated with an online vehicle configurator in accordance with the present disclosure.

Referring now specifically to FIG. 2, online user behavior associated with a vehicle configurator 202 and identifiable sales histories are analyzed by identifying and "flagging" web page 203 usage sequences that typically result in sales. Web sessions involving session sequences that do not typically result in sales can thus be filtered out, narrowing the universe of WA that represents potential leads. Such sessions are not considered active leads and online incentives may be withheld from these online users. They may simply be disregarded for sales purposes. Web sessions involving session sequences that do typically result in sales are not filtered out. Such sessions are considered active leads and online incentives may be provided to these online users. This narrowing focus is one aspect of the present disclosure.

More particularly, for each User ID on the vehicle configurator 202, the data may be enriched with multiple appendices that may be used to categorize the data into "high sales potential" data and "low sales potential" data. The data may be enriched with the number of unique sets of configurations that the user established during his or her visits, which is indicative of the range of vehicle options that the user explored, indicating his or her purchase seriousness. The data may also be enriched with the number of vehicle models that the user explored, which is indicative of the user's seriousness regarding purchasing a given vehicle in terms of vehicle model. The data may further be enriched with the minimum and maximum MSRP and MSRP range that the user explored, which is indicative of the user's seriousness regarding purchasing a given vehicle in terms of vehicle price, as well as his or her budget. The data may still further be enriched with the number of unique sessions that the user engaged in to arrive at a given configuration, indicating the degree of completeness of his or her purchase intentions. The data may still further be enriched with the total time spent to arrive at the given configuration, again indicating the degree of completeness of his or her purchase intentions. This and other data provides a set of filters that may be used to discriminate likely sales from unlikely sales, while filtering out long, non-serious sessions that simply represent noise. Using such filters, WA records can be reduced by 30-40%, for example, to increase the likelihood that web configurations that may lead to sales may be accurately identified. Sales leads are this more effectively generated and sales "nudges" are more efficiently targeted.

Figure 3:
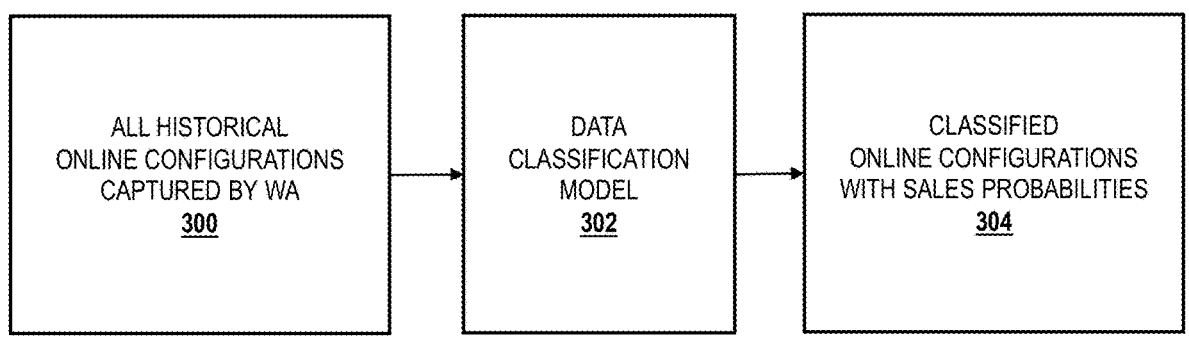
FIG. 3 is a schematic diagram of a baseline system for analyzing user behavior associated with an online vehicle configurator in accordance with the present disclosure.

Referring now specifically to FIG. 3, all historical online configuration data 300 captured by a WA tool is first obtained. A data model 302 is then applied to the historical online configuration data 300 to filter the historical online configuration data 300, thereby reducing it by a large percentage. The result is classified online configuration data 304 with probabilities that indicate propensity for converting to a sale. This narrowing process can be continued on an ongoing basis, identifying "hot" leads as the utilize the vehicle configurator 102 (FIG. 1) and 202 (FIG. 2). The data model 302 is a probabilistic model, such as a neural network (NN), random forest decision tree, k-nearest neighbor (k-NN) methodology, or the like. The operation of the data model 302 is described in greater detail herein below.

The NN is based on a collection of connected units, or nodes, that can transmit signals to other nodes. Each node receives a signal and processes it, and can signal nodes connected to it. The "signal" at a connection is a real number, and the output of each node is computed by a non-linear function of the sum of its inputs. The connections are called edges. Nodes and edges typically have a weight that adjusts as learning proceeds. The weight increases or decreases the strength of the signal at a connection, which is thresholded. The nodes are aggregated into layers. Different layers may perform different transformations on their inputs. Signals travel from the first layer (i.e., the input layer), to the last layer (i.e., the output layer), potentially after traversing the layers multiple times. NNs are trained by processing examples, each of which contains a known "input" and a known "result," forming probability-weighted associations between the two, which are stored within the data structure of the NN itself. The training of a NN is usually conducted by determining the difference between the processed output of the NN (often a prediction) and a target output, representing the error. The NN then adjusts its weighted associations according to a learning rule and using this error value. Successive adjustments cause the NN to produce output that is increasingly similar to the target output. In supervised learning, after a sufficient number of these adjustments, the training can be terminated based upon certain criteria. Such systems "learn" to perform tasks by considering examples, generally without being programmed with task-specific rules.

The random forest decision tree is a learning method for classification, regression, and other tasks that operate by constructing a multitude of decision trees at training time and outputting the class that is the mode of the classes (i.e., classification) or mean prediction (i.e., regression) of the individual trees.

The k-NN methodology is a non-parametric method for classification and regression. The input consists of the k closest training examples in a feature space. The output depends on whether k-NN is used for classification or regression. In k-NN classification, the output is a class membership, with an object classified by a plurality vote of its neighbors, with the object being assigned to the class most common among its k nearest neighbors. In k-NN regression, the output is the property value for the object. This value is the average of the values of k nearest neighbors. Weights can be assigned to the contributions of the neighbors, so that the nearer neighbors contribute more to the average than the more distant ones.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
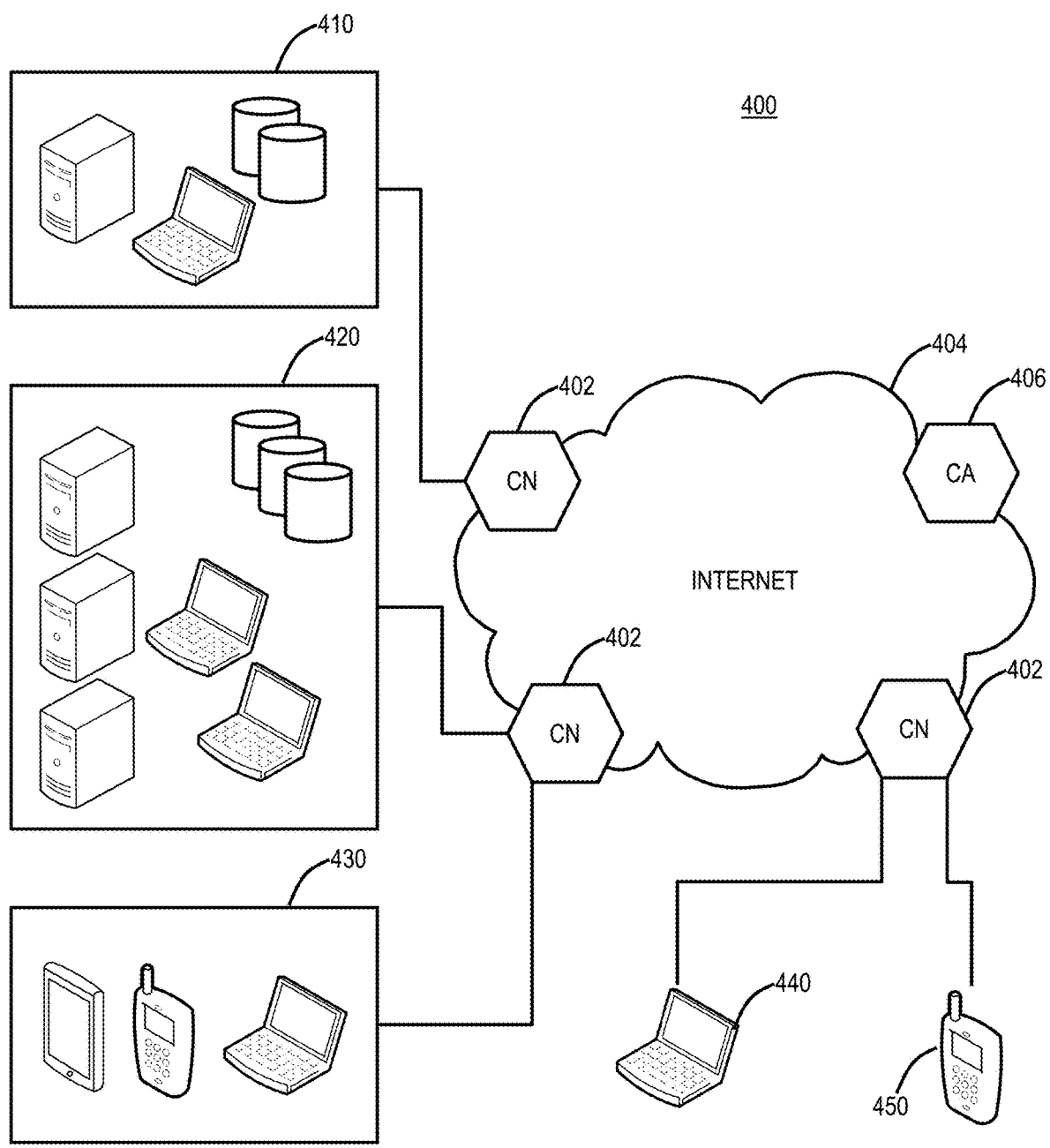
FIG. 4 is a network diagram of a cloud-based system for implementing various cloud-based services of the present disclosure.
Figure 5:
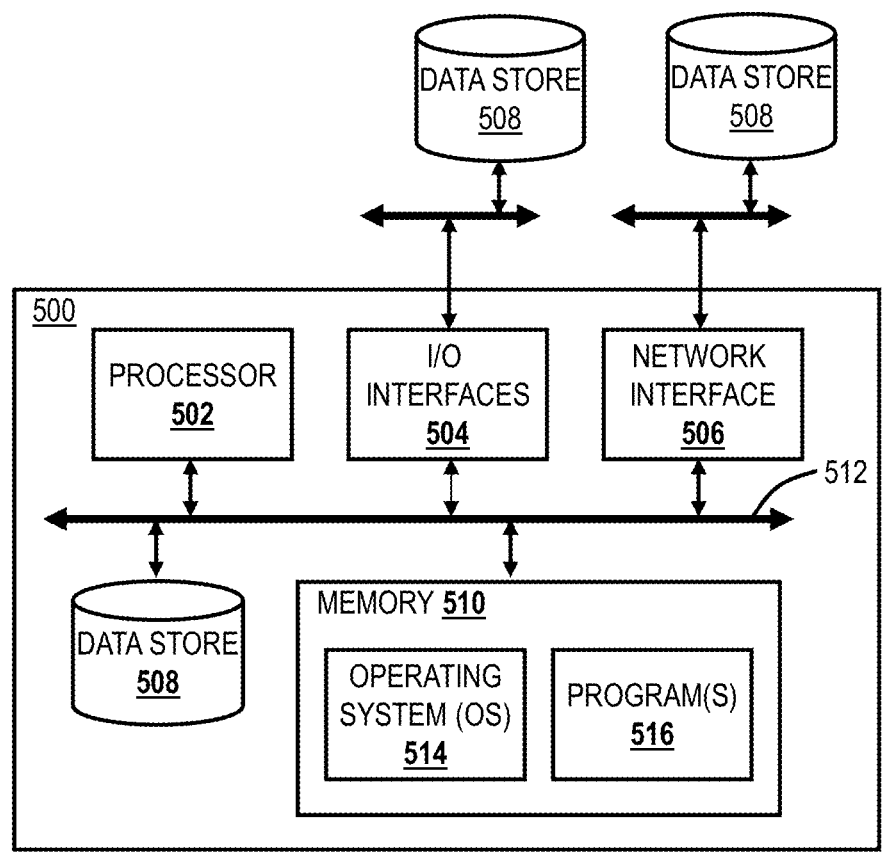
FIG. 5 is a block diagram of a server which may be used in the cloud-based system of FIG. 4 or stand-alone.

FIG. 4 is a network diagram of a cloud-based system 400 for implementing various cloud-based services of the present disclosure. The cloud-based system 400 includes one or more cloud nodes (CNs) 402 communicatively coupled to the Internet 404 or the like. The cloud nodes 402 may be implemented as a server 500 (as illustrated in FIG. 5) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 5 is a block diagram of a server 500, which may be used in the cloud-based system 400 (FIG. 4), in other systems, or stand-alone. For example, the CNs 402 (FIG. 4) and the central authority nodes 406 (FIG. 4) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 4). The network interface 506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
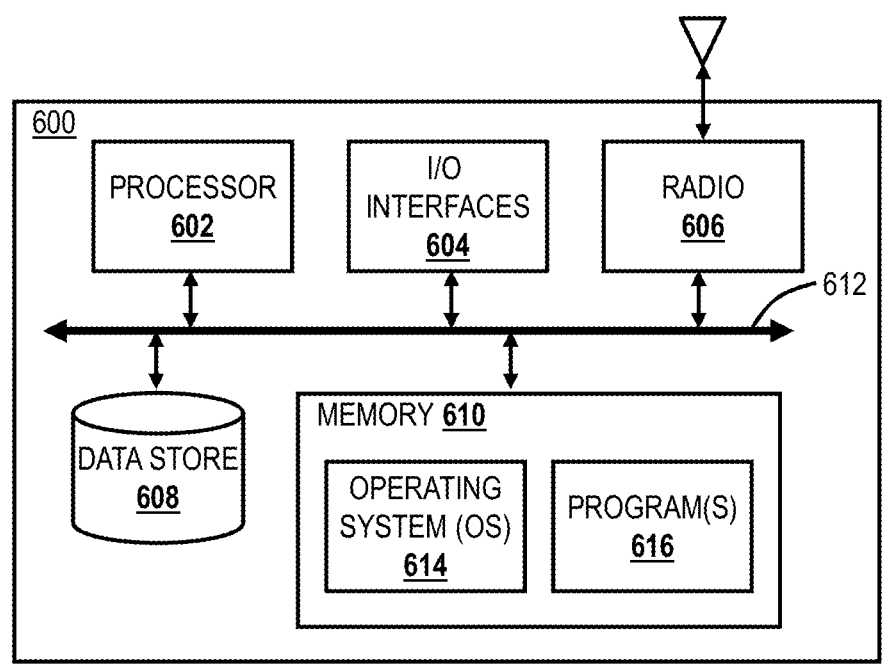
FIG. 6 is a block diagram of a user device which may be used in the cloud-based system of FIG. 4 or stand-alone.

FIG. 6 is a block diagram of a user device 600, which may be used in the cloud-based system 400 (FIG. 4), as part of a network, or stand-alone. Again, the user device 600 can be a vehicle, a smartphone, a tablet, a smartwatch, an Internet of Things (IoT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 6 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 6, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network, such as the cloud-based system 400 (FIG. 4).

Thus, usage-specific features are provided herein that are used to filter more probable sales WA records from less probable sales WA records. Next, the present disclosure further addresses generally combining the WA records with sales data for sales forecasting, as well as joint distribution assessment between WA data and sales data. In general, User ID is used to group Session IDs and individual configurations. Based on the usage-specific features, and using a classification data model, such as a NN, a random forest decision tree, or a k-NN, less probable WA records are filtered from the WA data as "noise." This leaves more-identifiable "hot" leads in the WA data, that may be pursued with inducement offers and the like.

In general, e-commerce platforms receive significant online traffic in the form of online shopping behavior, as evidenced by WA. In the absence of structured data modeling, it is difficult to decipher the correlations between WA and actual sales (historical and predicted). These correlations may be highlighted using a robust mathematical framework—connecting WA to historical and predicted sales. The correlations may be refined for individual product configurations, for example, such as those generated using a vehicle configurator.

Figure 7:
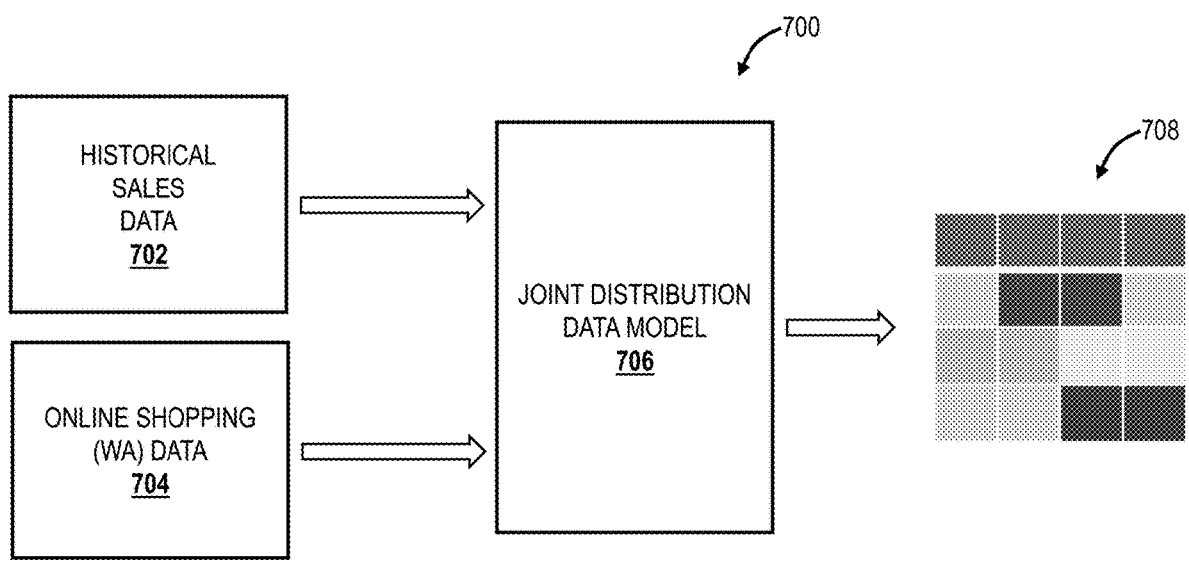
FIG. 7 is a schematic diagram of a system for correlating historical sales data to web analytics (WA) data to identify potential sales sessions in the WA data and to assess predicted sales based on the WA data.

FIG. 7 is a schematic diagram of a system 700 for correlating historical sales data 702 to data 704 to identify potential sales sessions in the WA data 704 and to assess predicted sales based on the WA data 704. The historical sales data 702 represents product configuration sales for a past time period. The WA data 704 represents online product configuration sessions. The joint distribution data model 706 correlates these two to generate a joint distribution heat map 708 representing high and low correlations between the historical sales data 702 and the WA data 704. Here, high correlations are indicative of products that should be produced in greater quantities, while low correlations are indicative of products that should be produced in lesser quantities.

Figure 8:
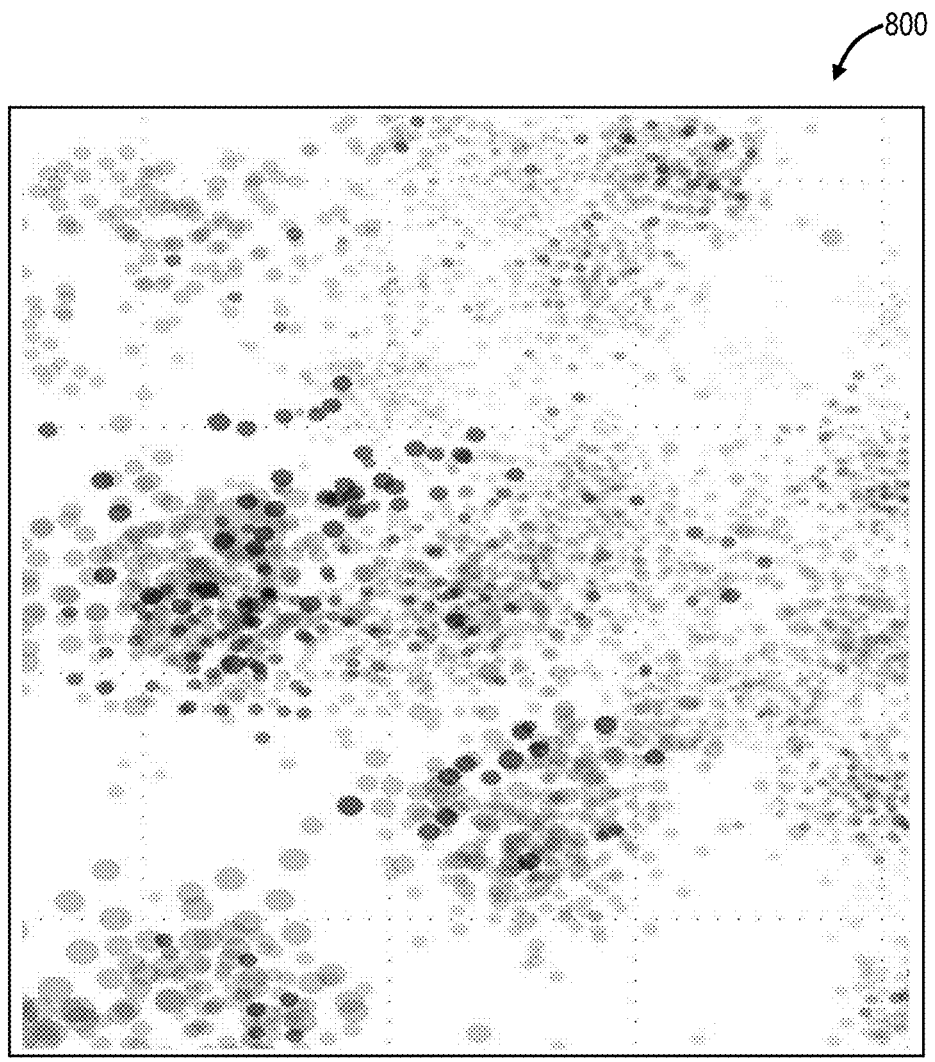
FIG. 8 is a tensor board visualization of WA data and historical sales data together.

FIG. 8 is a tensor board visualization 800 of WA data 704 (FIG. 7) and historical sales data 702 (FIG. 7) together. It can be seen that there are many more WA records than sales records, with both appearing in cluster-like fashion based on product configurations. The clustering for each generally follow similar trends. By way of assumptions, it is assumed that there is causality in events, i.e., WA happens and then resulting sales are made. It is also assumed that there is a constant population that can be grouped in a consistent manner, with the constant population being the WA data 704 and the sales data 702.

Figure 9:
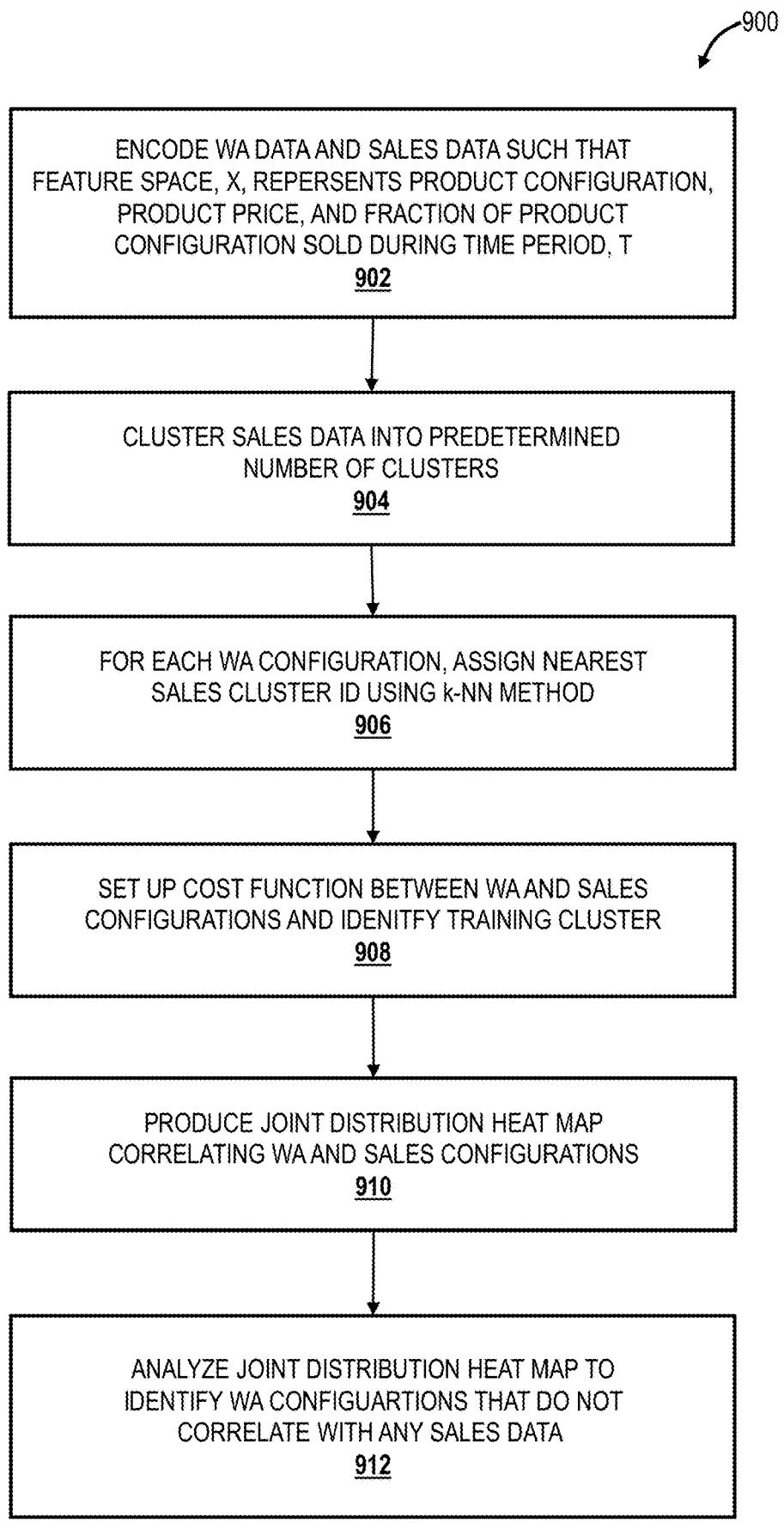
FIG. 9 is a schematic diagram of a method for correlating the historical sales data to the WA data to identify the potential sales sessions in the WA data and to assess the predicted sales based on the WA data.

FIG. 9 is a schematic diagram of a method 900 for correlating the historical sales data to the WA data to identify the potential sales sessions in the WA data and to assess the predicted sales based on the WA data. The WA data and the sales data are first one-hot encoded such that the feature space, X, represents the product configurations (e.g., vehicle model, features, sales version, etc.) along with the average MSRP (per product configuration) and the fraction of each product configuration sold in the time period, T, under analysis 902. X has dimensions [n×d], where n is the number of unique product configurations from the WA data or the sales data, respectively, and d is the total number of dimensions. Next, the sales data configurations are clustered to achieve a predetermined number of clusters using an "elbow method," for example 904. In this case, 6 clusters are utilized. For each WA configuration, a "nearest sales cluster ID" is then assigned using a k-NN method (k=3) 906. This ensures that the distribution per sub-spatial cluster remains consistent across the WA data and the sales data. A cost function is then set up between the WA and sales configurations and a training cluster is identified 908. All remaining clusters serve as validation data. Next, the joint distribution heat map is produced, mapping correlations between the WA and sales configurations 910. Finally, the joint distribution heat map is analyzed to identify product configurations that do not correlate with any sales data 912. It should be noted that mapping is non-linear and clusters can include multiple product configurations.

Figure 10:
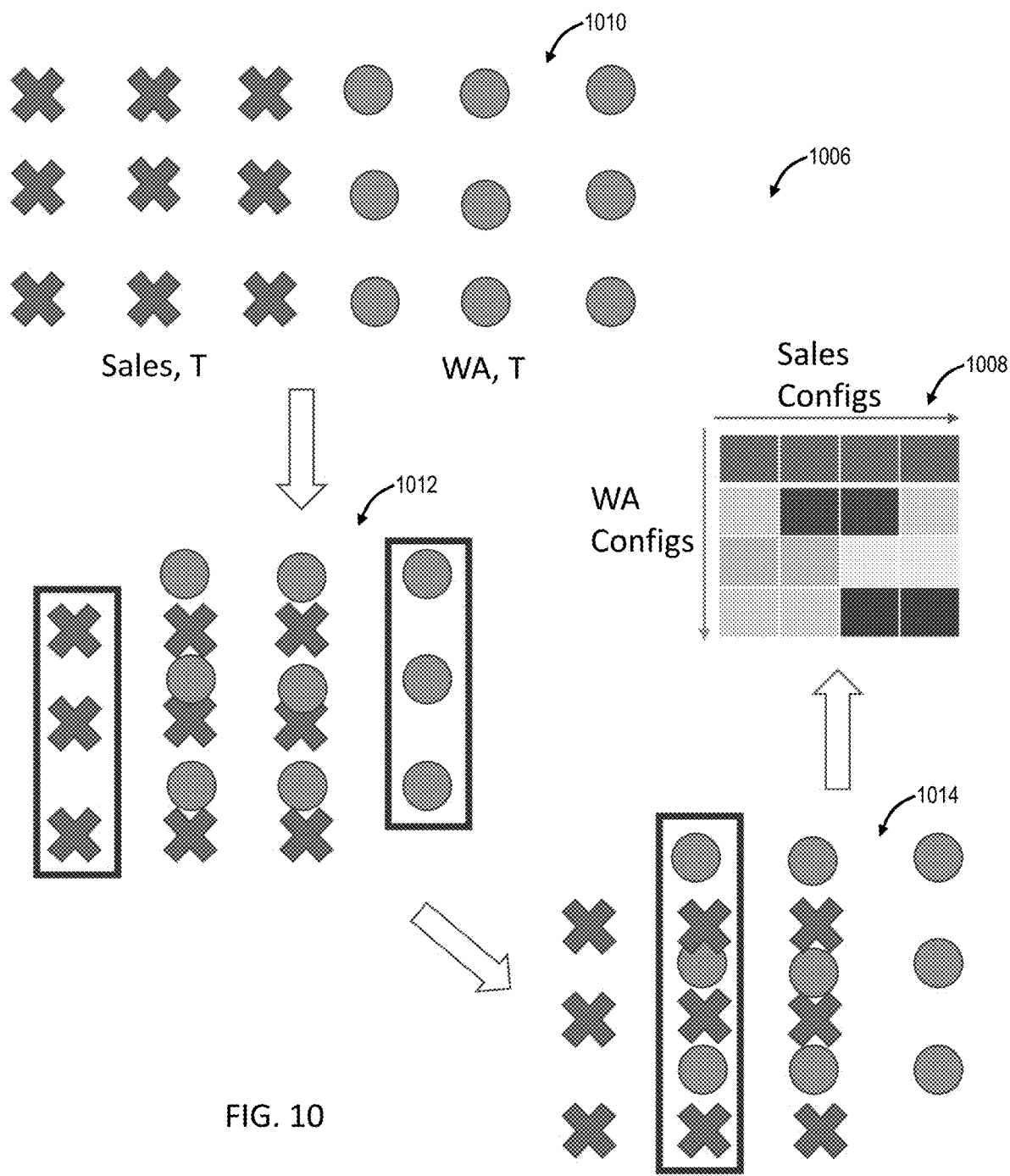
FIG. 10 is a schematic diagram of the joint distribution data model of the system for correlating historical sales data to web analytics data.

FIG. 10 is a schematic diagram of the joint distribution data model 1006 of the system 700 (FIG. 7) for correlating historical sales data to web analytics data. The joint distribution data model 1006 first defines a joint population (WA+sales) for time period T 1010. Then, a "cost" metric is defined that penalizes configurations that do not co-occur 1012. Next, sub-space mapping is learned from a subset of the data (i.e., one cluster) and performance is observed on the complete data 1014. Finally, the joint distribution is generated 1008.

In general, most vehicle configurators and the like are designed to find an "exact match" corresponding to a user-specified search. No method exists to find a "next best match" from existing product configurations, available or potentially available. Further, forecasting for vehicle sales per configuration has been done using historical sales data only to date (predicting future sales based on past sales). No solutions have been developed to combine online shopping cart information with historical sales data to refine such vehicle sales forecasts. Here, online shopping cart information is used to improve product "matchmaking" and for future sales forecasting. WA is used to predict sales per "unique" product configuration, and, based on WA data and historical sales data, weights corresponding to a "next best match" per customer are provided at a vehicle configurator level.

Figure 11:
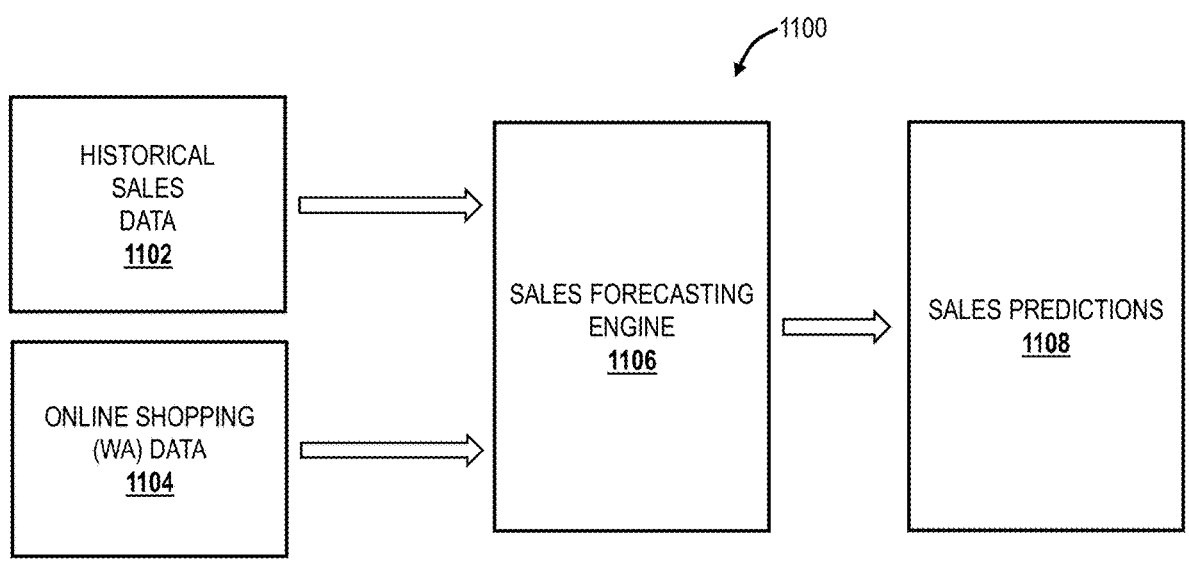
FIG. 11 is a schematic diagram of a system for using historical sales data and WA data to forecast future sales using a sales forecasting engine.

FIG. 11 is a schematic diagram of a system 1100 for using historical sales data 1102 and WA data 1104 to forecast future sales 1108 using a sales forecasting engine 1106. Here, the WA data 1104 is online shopping cart data, and the historical sales data 1102 covers a predetermined historical period. Typically, the sales forecasting engine 1106 is a random forest or generalized liner model for regression (P(C|A,B)). Test data is analyzed using prior training data. It is observed that there is a significant improvement in sales forecasts using both WA and historical sales data for regression modeling and predicting sales per product configuration in future time periods.

Given aggregated user submitted leads/last configurations, A, and past sales configurations, B, and aggregated sales configuration forecasts, C, the joint probability distribution is found using sub-spatial clustering. The goal is to find P(C|B,A)=P(C,B,A)/P(B,A), where P(C|B,A) is a conditional probability, P(C,B,A) is a joint probability distribution, and P(B,A) is a propensity for sale per unique configuration using WA data and sales data.

A random forest model or the like utilizes feature weighting to indicate the strength of each feature in a product configuration when performing the above sales forecasting. Other such methodologies include Fisher scoring, total variance analysis, Fisher discriminant analysis, etc. Thus, if an "exact" product configuration match is not available to a configurator, a "closest" match can be found using the most highly weighted common features. Thus, a last submitted online product configuration per unique user ID and session ID can be considered as "best" online shopping cart (WA) data that may be used in sales forecasting, and historical sales data appended to the WA data can be used to improve sales predictions and provide feature weights for a weighted "next best match" functionality.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
receiving web analytics data comprising identification information from a web analytics database of a web interface;
filtering the web analytics data comprising the identification information to generate subset of the web analytics data that indicates a probability for completion of a sales transaction above a predetermined probability taking into account product configurations that do not correlate with any sales data;
offering users or sessions associated with the subset of the web analytics data an offer inducement to complete sales transaction via the web interface;
correlating historical sales transaction data to the web analytics data to determine which product types are more probable to be involved in the sales transaction and which product types are less probable to be involved in the sales transaction; and
adjusting the product configurations of one or more of a manufacturing operation and an inventory allotment based on the determination as to which product types are more probable to be involved in the sales transaction and which product types are less probable to be involved in the sales transaction;
wherein correlating the historical sales transaction data to the web analytics data comprises:
encoding the web analytics data and the historical sales transaction data such that a resulting feature space represents product configurations, price per product configuration, and a fraction of each product configuration sold in a time period, T, for machine language processing by a neural network;
clustering web analytics records associated with the web analytics data and sales transaction records associated with the sales transaction data;
for each cluster, assigning a nearest cluster identification using a k-nearest neighbor method;
establishing a cost function between clusters;
selecting a training cluster and a plurality of validation clusters;
training the neural network using the training cluster and validating output of the neural network using the plurality of validation clusters;
based on the output of the neural network, generating and displaying on a display a joint distribution heat map indicating correlations between the web analytics data and the historical sales transaction data; and
using the joint distribution heat map, identifying the product configurations that do not correlate with any sales data.

2. The method of claim 1, wherein filtering the web analytics data comprising the identification information comprises appending usage-specific feature data to each record of the web analytics data comprising the identification information.

3. The method of claim 2, wherein the usage-specific feature data comprises one or more of: (1) number of unique sets of product configurations established by each user using the web interface, (2) number of product types explored by each user using the web interface, (3) price range explored by each user using the web interface, (4) number of unique sessions engaged in by each user to arrive at a given product configuration using the web interface, and (5) total time spent by each user to arrive at the given product configuration.

4. The method of claim 2, wherein filtering the web analytics data comprising the identification information further comprises determining a probability for the completion of the sales transaction for each record of the web analytics data comprising the identification information and the appended usage-specific feature data using a classification data model and thresholding the probability for the completion of the sales transaction for each record of the web analytics data comprising the identification information.

5. The method of claim 4, wherein the classification data model comprises one of a neural network model, a random forest decision tree model, and a k-nearest neighbor model.

6. A non-transitory computer-readable medium comprising instructions stored in a memory and executed by a processor to carry out the steps comprising:
receiving web analytics data comprising identification information from a web analytics database of a web interface;
filtering the web analytics data comprising the identification information to generate subset of the web analytics data that indicates a probability for completion of a sales transaction above a predetermined probability taking into account product configurations that do not correlate with any sales data;
offering users or sessions associated with the subset of the web analytics data an offer inducement to complete sales transaction via the web interface;
correlating historical sales transaction data to the web analytics data to determine which product types are more probable to be involved in the sales transaction and which product types are less probable to be involved in the sales transaction; and
adjusting the product configurations of one or more of a manufacturing operation and an inventory allotment based on the determination as to which product types are more probable to be involved in the sales transaction and which product types are less probable to be involved in the sales transaction;
wherein correlating the historical sales transaction data to the web analytics data comprises:
encoding the web analytics data and the historical sales transaction data such that a resulting feature space represents product configurations, price per product configuration, and a fraction of each product configuration sold in a time period, T, for machine language processing by a neural network;
clustering web analytics records associated with the web analytics data and sales transaction records associated with the sales transaction data;

for each cluster, assigning a nearest cluster identification using a k-nearest neighbor method;
establishing a cost function between clusters;
selecting a training cluster and a plurality of validation clusters;
training the neural network using the training cluster and validating output of the neural network using the plurality of validation clusters;
based on the output of the neural network, generating and displaying on a display a joint distribution heat map indicating correlations between the web analytics data and the historical sales transaction data; and
using the joint distribution heat map, identifying the product configurations that do not correlate with any sales data.

7. The non-transitory computer readable medium of claim 6, wherein filtering the web analytics data comprising the identification information comprises appending usage-specific feature data to each record of the web analytics data comprising the identification information.

8. The non-transitory computer readable medium of claim 7, wherein the usage-specific feature data comprises one or more of: (1) number of unique sets of product configurations established by each user using the web interface, (2) number of product types explored by each user using the web interface, (3) price range explored by each user using the web interface, (4) number of unique sessions engaged in by each user to arrive at a given product configuration using the web interface, and (5) total time spent by each user to arrive at the given product configuration.

9. The non-transitory computer readable medium of claim 7, wherein filtering the web analytics data comprising the identification information further comprises determining a probability for the completion of the sales transaction for each record of the web analytics data comprising the identification information and the appended usage-specific feature data using a classification data model and thresholding the probability for the completion of the sales transaction for each record of the web analytics data comprising the identification information.

10. The non-transitory computer readable medium of claim 9, wherein the classification data model comprises one of a neural network model, a random forest decision tree model, and a k-nearest neighbor model.

11. A method, comprising:
receiving web analytics data from a web analytics database of a web interface;
correlating historical sales transaction data to the web analytics data to determine which product configurations are more probable to be involved in a sales transaction and which product configurations are less probable to be involved in the sales transaction taking into account product configurations that do not correlate with any sales data; and
adjusting the product configurations of one or more of a manufacturing operation and an inventory allotment based on the determination as to which product configurations are more probable to be involved in the sales transaction and which product configurations are less probable to be involved in the sales transaction taking into account the product configurations that do not correlate with any sales data;
wherein correlating the historical sales transaction data to the web analytics data comprises:
encoding the web analytics data and the historical sales transaction data such that a resulting feature space represents product configurations, price per product configuration, and a fraction of each product configuration sold in a time period, T, for machine language processing by a neural network;
clustering web analytics records associated with the web analytics data and sales transaction records associated with the sales transaction data;
for each cluster, assigning a nearest cluster identification using a k-nearest neighbor method;
establishing a cost function between clusters;
selecting a training cluster and a plurality of validation clusters;
training the neural network using the training cluster and validating output of the neural network using the plurality of validation clusters;
based on the output of the neural network, generating and displaying on a display a joint distribution heat map indicating correlations between the web analytics data and the historical sales transaction data; and
using the joint distribution heat map, identifying the product configurations that do not correlate with any sales data.

12. The method of claim 11, wherein correlating the historical sales transaction data to the web analytics data comprises finding a joint probability distribution between the historical sales transaction data and the web analytics data using sub-spatial clustering.

13. The method of claim 12, wherein the sub-spatial clustering is performed using one of a random forest model, a Fisher scoring model, a total variance analysis model, and a Fisher discriminant analysis model that assigns weights to each feature in each product configuration.

14. The method of claim 13, further comprising, given a user submitting a desired product configuration via the web interface, suggesting a closest product configuration via the web interface based on a closest match related to features in each product configuration with weights above a predetermined weight.

15. The method of claim 11, wherein the method is performed as non-transitory computer-readable medium instruction steps stored in a memory and executed by a processor.

* * * * *